United States Patent Office 3,511,861
Patented May 12, 1970

---

3,511,861
SELECTED DERIVATIVES OF 6,6-DIFLUORO-17α-ETHYNYL-17β-HYDROXYESTER-4-ENE-3-ONE
George Albert Boswell, Jr., Wilmington, Del., assignor to E. I. du Pont de Nemours and Company, Wilmington, Del., a corporation of Delaware
No Drawing. Filed Apr. 11, 1968, Ser. No. 720,493
Int. Cl. C07c *169/20*
U.S. Cl. 260—397.5   17 Claims

ABSTRACT OF THE DISCLOSURE

Described and claimed are new steroid compounds of the formula

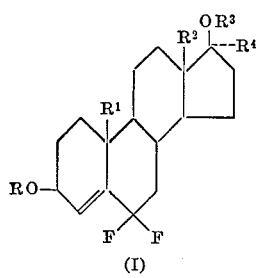

wherein
$R^1$ is hydrogen or methyl;
$R^2$ is methyl or ethyl;
R and $R^3$, which may be the same or different, are hydrogen, an alkyl or oxacycloalkyl group of up to five carbon atoms or an acyl group of an aliphatic or cycloaliphatic acid having up to six chain carbon atoms and a total of no more than eleven carbon atoms; and $R^4$ is —C≡CH, —C≡CCl, —C≡CCH₃, —C≡CCF₃, —CH=CH₂, —CH=CHCH₃, —CH₂CH₃ or
—CH₂CH₂CH₃

The preferred compounds of this invention are those in which R and $R^3$ are hydrogen or acetyl, $R^1$ is H and $R^4$ is —C≡CH or —C≡CCH₃.

The compounds of this invention are useful as oral progestational agents.

BACKGROUND OF THE INVENTION

Field of the invention

This invention relates to a novel class of steroid compounds. More particularly this invention relates to selected derivatives of 6,6-difluoro-17α-ethynyl-17β-hydroxyestr-4-ene-3-one (otherwise known as 6,6-difluoronorethindrone) and the corresponding androstenone (i.e., 6,6-difluoroethisterone) which are useful as oral progestational agents.

Description of the prior art

Since the discovery by Fried and Sabo [J. Am. Chem. Soc., 75, 2273 (1953) and J. Am Chem. Soc., 76, 1455 (1954)] that the introduction of a fluorine atom at the 9-position in cortisol resulted in enhanced biological activity, an ever-increasing amount of research has been directed toward synthesizing new types of fluorine-containing steroids. The intensive work in this field is due to the advantages which frequently accrue from the presence of fluorine in steroidal drugs.

The new compounds of this invention are all derivatives of the fluorine-containing steroids 6,6-difluoro-17α-ethynyl-17β-hydroxyestr-4-ene-3-one and 6,6-difluoro-17α-ethynyl-17β-hydroxy-androst-4-ene-3-one, preparation of which is described in U.S. Pat. 3,219,673, issued Nov. 23, 1965, to Boswell. 6,6 - difluoro - Δ⁴ - 3 - keto - 17α-ethylyl - 17β - hydroxy steroids are also disclosed by Boswell in J. Org. Chem., 31, 991 (1966). Of further interest in conjunction with this invention is the publication of P. Westerhof et al., found at Rec. Trav. Chim., 84, 863 (1965). This paper describes the synthesis of 6,6-difluoro-Δ⁴-3-keto steroids in the retro series (9β, 10α) by the reaction of 6-fluoro-Δ³,⁵-dienol ethers with FClO₃ according to the following equation:

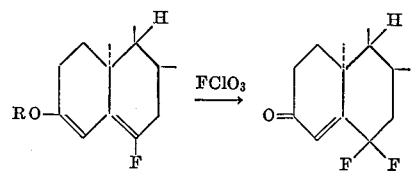

The paper is primarily concerned with the preparation of 6-fluoro and 6-chloro-Δ⁴,⁶-3-ketones via the process where X=F or Cl:

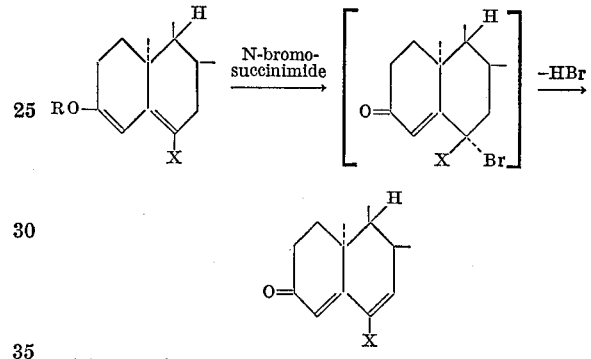

No mention of estrane (19-norandrostane) derivatives is made.

SUMMARY AND DETAILS OF THE INVENTION

The new compounds of this invention are steroids of the formula

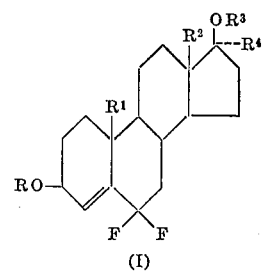

wherein
$R^1$ is a hydrogen or methyl;
$R^2$ is methyl or ethyl;
R and $R^3$, which may be the same or different, are hydrogen, an alkyl or oxacycloalkyl group of up to five carbon atoms or an acyl group of an aliphatic or cycloaliphatic acid having up to six carbon atoms and a total of no more than eleven carbon atoms; and $R^4$ is —C≡CH, —C≡CCl, —C≡CCH₃, —C≡CCF₃, —CH=CH₂, —CH=CHCH₃, —CH₂CH₃, or
—CH₂CH₂CH₃

The preferred compounds of this invention are those in which R and $R^3$ are hydrogen or acetyl, $R^1$ is H and $R^4$ is —C≡CH or —C≡CCH₃. The majority of the compounds of this invention may be prepared using as the basic starting materials either 6,6-difluoro-17α-ethynyl-17β-hydroxyandrost-4-en-3-one, preparation of which is described in U.S. Pat. 3,219,673, issued Nov. 23, 1965, to Boswell, or 5-estren-3β,17β-diol diacetate, preparation of which is described by Iriarte in J. Am. Chem. Soc., 81, 436 (1959). The reactions by which these starting materials are converted to the compounds of this invention are generally well established in the art. Details of the various synthetic schemes employed will be apparent from the following examples.

SPECIFIC EMBODIMENTS OF THE INVENTION

There follow some non-limiting examples illustrative of the invention.

EXAMPLE 1

6,6-difluoro-17α-ethynylandrost-4-ene-3β,17β-diol

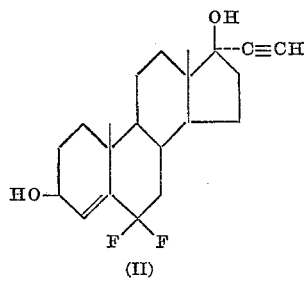

(II)

A mixture of 1.34 g. of 6,6-difluoro-17α-ethynyl-17β-hydroxyandrost-4-en-3-one (U.S. 3,219,673) and 1.40 g. of lithium aluminum tri-t-butoxyhydride in dry tetrahydrofuran (50 ml.) was allowed to stir at ambient temperature for 48 hours under nitrogen. The homogeneous reaction mixture was poured with stirring into 200 ml. of cold 5% acetic acid, and this mixture was extracted with methylene chloride. The methylene chloride solution was washed with water and saturated salt solution, dried over anhydrous magnesium sulfate, and evaporated to dryness under reduced pressure to afford a clear colorless syrup which partially solidified:

Infrared:

$\lambda_{max.}^{CCl_4}$ 2.80, 2.95 (—OH), 3.05μ (≡C—H)

EXAMPLE 2

6,6-difluoro-17α-ethynylandrost-4-ene-3β,17β-diol diacetate

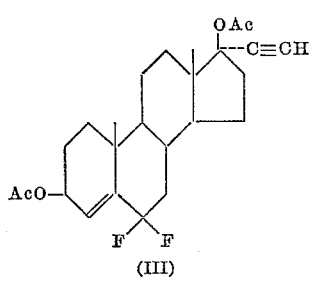

(III)

The crude ethynyldiol of Example 1 was dissolved in 50 ml. of dry pyridine and 30 ml. of acetic anhydride. This solution was heated to 100° under nitrogen for 24 hours. The dark solution was cooled to room temperature and then poured into a mixture of ice and water. This mixture was stirred for two hours, after which the precipitate which formed was collected on a filter, washed well with water, and air dried. Trituration of the crude precipitate with cold methanol gave dark but well-formed crystals. The crude product was adsorbed from a small volume of benzene onto a column of neutral alumina (70 g., activity III). Elution with hexanebenzene 2:1, 1:1, and 1:2 gave 0.96 g. of colorless crystalline diacetate. The crystalline fractions were combined and recrystallized from methanol to afford 0.66 g. of analytically pure 6,6-difluoro-17α-ethynylandrost-4-ene-3β,17β-diol diacetate, M.P. 178°, [α]$_D^{24}$ —72°. A second crop amounted to 46 mg.

Analysis.—Calc'd for $C_{25}H_{32}F_2O_4$ (percent): C, 69.1; H, 7.43; F, 9.74. Found (percent): C, 69.11; H, 7.43; F, 8.81, 8.90.

Infrared: $\lambda_{max}$ 3.05 (≡CH), 4.75 (—C≡C), 5.72 (acetate carbonyl), 5.76 (acetate carbonyl), 8.15 (acetate C—O—C), 8.60

H, N.M.R.: 0.92 (C–18 methyl), 1.17 (C–19 methyl, doublet, J=ca. 2.5 cps.), 2.03 (C–17 acetate methyl), 2.08 (C–3 acetate methyl), 2.58 (C≡C-H), 6.0 p.p.m. (vinyl hydrogen, a multiplet).

$F^{19}$, N.M.R.: An AB pattern at +4690, +4942, +5610, and +5853 cps.

the low field pair being split into apparent doublets, J=32 cps.

EXAMPLE 3

6,6-difluoro-17α-ethynylestr-4-ene-3β,17β-diol (A) 5α-fluoro-3β,17β-dihydroxyestran-6-one-diacetate

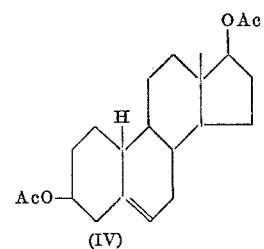

(IV)

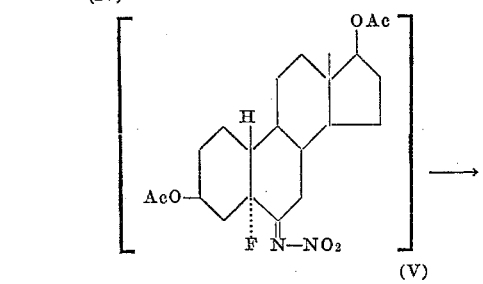

(V)

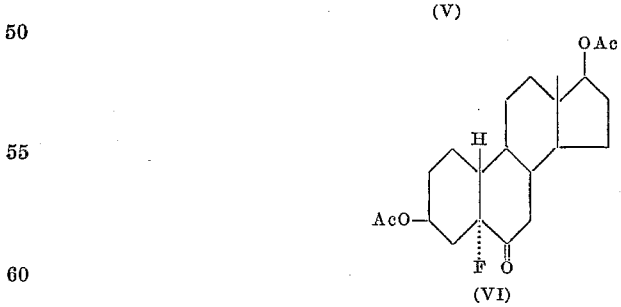

(VI)

A stirred solution of 33.0 g. of 5-estrene-3β,17β-diol diacetate [Iriarte, J. Am. Chem. Soc., 81, 436 (1959)] in 200 ml. of methylene chloride was cooled in an ice bath and was then treated with a slow stream of nitrosyl fluoride (11 g. over 7 hours) as described in U.S. 3,279,673, to give a thick syrup which partially crystallized. The infrared spectrum of this product displayed typical nitrimine bands. The total crude nitrimine (V) was adsorbed from benzene onto a neutral alumina (1 kg., activity III). Elution with benzene-hexane (1:1) and benzene returned crystalline fluoroketone which after two recrystallizations from acetone-hexane amounted to 11.8 g., 1st crop, and 4.34 g., 2nd crop. A portion was recrystallized from acetone-hexane for analysis, M.P. 170–172°, $[\alpha]_D^{23}$ —19° (c. 1.245, CHF), $\lambda_{max.}^{EtOH}$ 300 m$\mu$ ($\epsilon$=76); $\lambda_{max.}^{Nujol}$ 5.78 (doublet), 8.0, 8.53$\mu$

*Analysis.*—Calc'd for $C_{22}H_{31}FO_5$ (percent): C, 67.0; H, 7.92; F, 4.82. Found (percent): C, 66.69; H, 7.74; F, 4.81.

The $F^{19}$ N.M.R. spectrum at 56.4 mc./sec. in $CDCl_3$ exhibits a triplet (w.-s.-w.) with peaks at +9430, +9467, and +9504 cps. from trichloromethane (internal). The proton N.M.R. spectrum in deuteriochloroform exhibits a methyl peak at 0.78 (C–18, singlet) and 2.02 p.p.m. (acetate).

(B) 5α,6,6-trifluoroestrane-3β,17β-diol diacetate

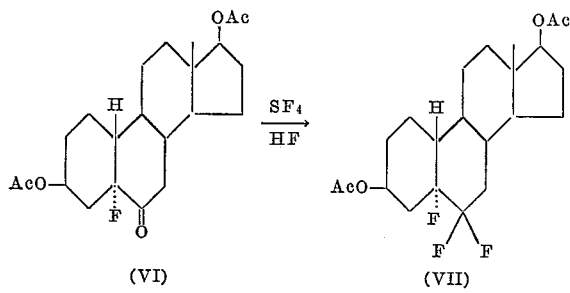

A mixture of 7.0 g. of the above fluoroketone, 75 ml. of methylene chloride, 1.0 ml. of water and 16.0 g. of sulfur tetrafluoride was shaken at 20±2° C. for 10 hours after which the reaction mixture was shaken successively with water, 5% sodium bicarbonate solution, water and saturated salt solution, and then dried over magnesium sulfate. Evaporation of the straw colored solution under reduced pressure afforded a tan crystalline residue. Recrystallization from $CH_2Cl_2$-hexane afforded pure trifluorodiacetate (6.16 g.), M.P. 188–190°, $[\alpha]_D^{23}$ ±0° (c. 1.73, CHF);

$\lambda_{max.}^{Nujol}$ 5.79 (acetate C=O), 8.55$\mu$ (C—F)

*Analysis.*—Calc'd for $C_{22}H_{31}F_3O_4$ (percent): C, 63.5; H, 7.50; F, 13.65. Found (percent): C, 63.40; H, 7.30; F, 13.28, 13.20.

(C) 5α,6,6-trifluoroestrane-3β,17β-diol

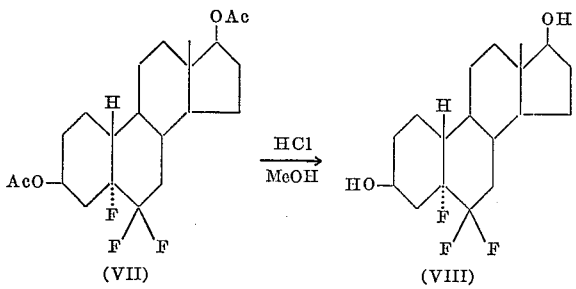

A solution of 5.35 g. of the above trifluorodiacetate, 6 ml. of concentrated hydrochloric acid and 50 ml. of methanol was heated to reflux for 1 hour. The hot solution was carefully diluted with hot water and then allowed to cool slowly to room temperature during which time the trifluorodiol crystallized as long white needles, yield 4.28 g. This product was recrystallized from acetone-hexane to afford pure 5α-6,6-trifluoroestrane-3β,17β-diol (4.13 g.), M.P. 170–171°, $[\alpha]_D^{23}$ ±0° (c. 1.04, CHF);

$\lambda_{max.}^{Nujol}$ 2.94$\mu$ (—OH)

The analytical sample was sublimed.

*Analysis.*—Calc'd for $C_{18}H_{27}F_3O_2$ (percent): C, 65.20; H, 8.18; F, 17.10. Found (percent): C, 65.06; H, 8.07; F, 16.87.

(D) 5α,6,6-trifluoroestrane-3,17-dione

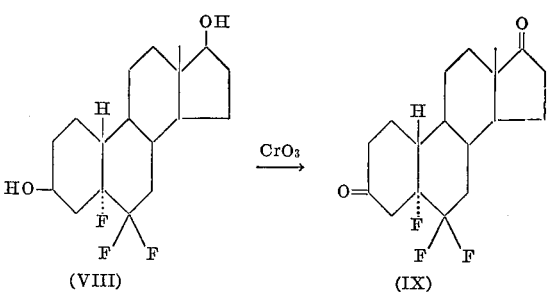

Three and a half grams of the above trifluorodiol in 50 ml. of acetone was treated with excess 8 N chromic acid solution at 15° C. for 30 minutes. The excess oxidizing agent was consumed by adding a few drops of methanol. The resultant green solution was filtered to remove inorganic salts, and the filtrate was slowly diluted with hot water until the product began to crystallize. It was then cooled in an ice bath. The product was collected on a filter, washed well with water, and air dried, yield 2.91 g. This material was recrystalllized from acetone to give pure- trifluorodione (2.0 g., 1st crop; 0.35 g., 2nd crop), as large colorless cubes, M.P. 178–207° (dec.), $[\alpha]_D^{24}$ —84° (c. 1.30, CHF);

$\lambda_{max.}^{Nujol}$ 5.81 (C–3 and C–17 C=O, broad band), 8.75$\mu$ (C—F)

*Analysis.*—Calc'd for $C_{18}H_{23}F_3O_2$ (percent): C, 65.90; H, 7.06; F, 17.33. Found (percent): C, 65.93; H, 7.08; F, 17.11.

(E) 6,6-difluoro-4-estrene-3,17-dione

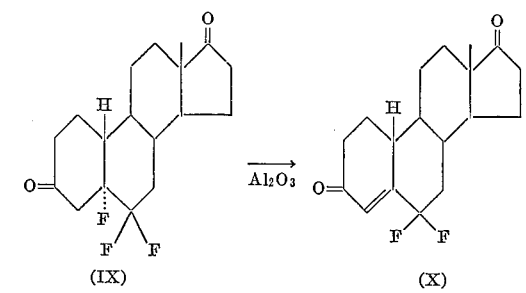

A solution of 2.35 g. of trifluorodione in 25 ml. of benzene was adsorbed onto neutral alumina (80 g., act. III). After 30 minutes, elution with benzene returned colorless crystalline product. Recrystallization from acetone-hexane afforded 6,6-difluoro-4-estrene-3,17-dione (1.80 g.) as colorless well-formed crystals, M.P. 153.5–155.5°, $[\alpha]_D^{24}$ +7° (c. 1.38, CHF), $\lambda_{max.}^{EtOH}$ 225 ($\epsilon$ =13,300), 298 ($\epsilon$ =55), and 330 m$\mu$ ($\epsilon$ =40);

$\lambda_{max.}^{Nujol}$ 5.77 (C–17 C=O), 5.93 (conj. C–3 C=O), 8.55 (C—F), 10.90$\mu$ A sample was sublimed.

*Analysis.*—Calc'd for $C_{18}H_{22}F_2O_2$ (percent): C, 70.2; H, 7.18; F, 12.29. Found (percent): C, 70.25; H, 7.18; F, 12.24, 12.21.

(F) 6,6-difluoro-4-estrene-3ξ,17β-diol

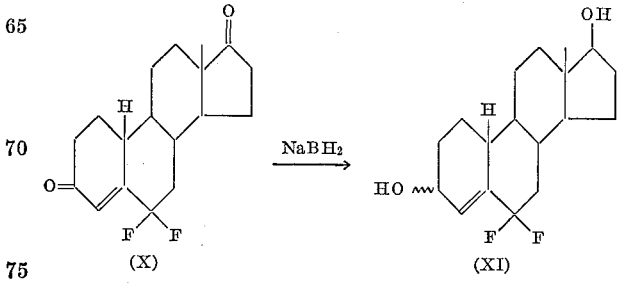

A mixture of 1.85 g. of difluoro-Δ⁴-3,17-dione, 0.83 g. of sodium borohydride and 75 ml. of absolute ethanol was allowed to stir at room temperature for 22 hours after which time the clear solution was carefully poured into a stirred mixture of ice and water. After the mixture has been stirred for two hours, the precipitated solid which had formed was collected on a filter, washed well with water and air dried, yield 1.70 g.

$\lambda_{max.}^{Nujol}$ 2.90, 3.0, 3.15 (—OH), 8.58μ (CF₂)

This product was recrystallized from acetone-hexane, yield 1.48 g., M.P. 90–110°, $[\alpha]_D^{24}$ —32° (c. 1.26, CHF).

*Analysis.*—Calc'd for C₁₈H₂₆F₂O₂ (percent): C, 69.2; H, 8.39; F, 12.15. Found (percent): C, 69.21, 68.85; H, 8.78, 8.85; F, 11.86.

(G) 6,6-difluoro-17β-hydroxyestr-4-en-3-one

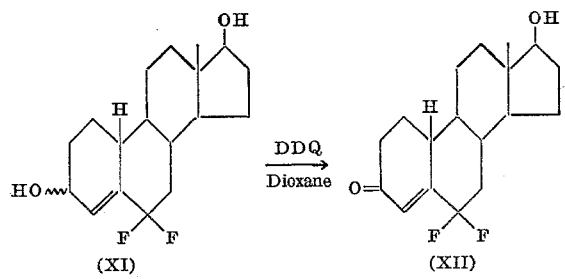

A solution of 1.38 g. of 6,6-difluoroestr-4-ene-3ξ, 17β-diol, 1.38 g. of recrystallized dichlorodicyanobenzoquinone and 25 ml. of dry dioxane was allowed to stir for 3 days at room temperature. During this time copious amounts of a yellow precipitate formed. This was removed by filtration, and the filtrate was diluted with benzene and then washed successively with 5% sodium bicarbonate solution, 5% sodium hydroxide solution, water and saturated salt solution. After being dried over magnesium sulfate, the solution was evaporated to dryness under reduced pressure to give a clear syrup. This was chromatographed on neutral alumina (act. III, 50 g.). Elution with benzene-hexane (1:1) and benzene returned colorless solid which was recrystallized from acetone-hexane to afford 745 mg. of 6,6-difluoro-17β-hydroxyestr-4-en-3-one, M.P. 156–158°, $[\alpha]_D^{24}$ —61° (c. 1.31, CHF), $\lambda_{max.}^{EtOH}$ 225–230 (ε=12,000) and 333 mμ (ε=40); $\lambda_{max.}^{Nujol}$ 2.45 (—OH), 5.95 (conj. C–3 C=O), 8.60μ (CF₂)

The analytical sample was sublimed.

*Analysis.*—Calc'd for C₁₈H₂₄O₂ (percent): C, 69.6; H, 7.78; F, 12.20. Found (percent): C, 69.88; H, 7.83; F, 12.65, 12.85.

(H) 6,6-difluoro-17β-hydroxyestr-4-en-3-one 3-ethylene ketal

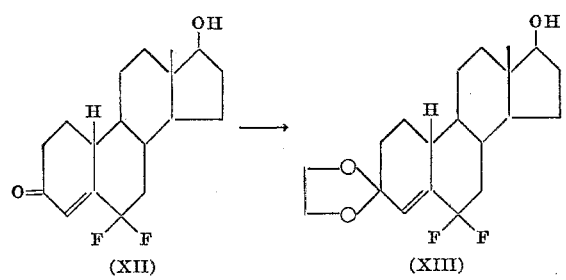

A solution of 2.37 g. of 6,6-difluoro-19-nortestosterone (alternately named 6,6-difluoro-4-estren-17β-ol-3-one), 0.54 g. of p-toluenesulfonic acid monohydrate and 13.5 ml. of ethylene glycol in 55 ml. of dry benzene was heated at reflux with stirring for 24 hours using a Sterling-Bidwell moisture trap to collect water of reaction. The two phase reaction mixture was cooled and the phases separated. The organic phase was washed with 5% sodium bicarbonate solution, water and saturated salt solution. The benzene solution was dried over anhydrous magnesium sulfate and then evaporated under reduced pressure to afford ketal as a tan solid, yield 2.3 g. This product was carried on to the next step without further purification. The infrared spectra showed essentially complete loss of the Δ⁴-3-keto system. Infrared:

$\lambda_{max.}^{CCl_4}$ 2.75, 2.87 (—OH), 3.25μ (vinyl hydrogen)

(I) 6,6-difluoroestr-4-ene-3,17-dione 3-ethylene ketal

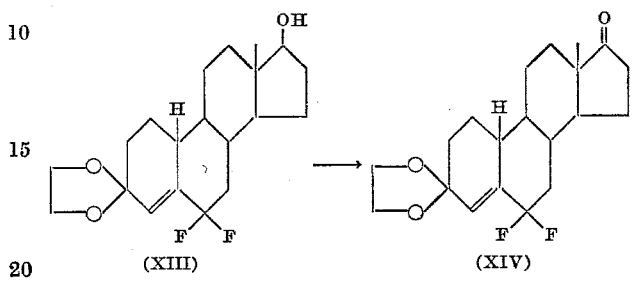

The ketal from above procedure was dissolved in 50 ml. of dry pyridine and to this solution cooled in an ice bath was added with stirring 2.4 g. of solid chromium trioxide. The resultant mixture was allowed to stir at ambient temperature for 20 hours, after which it was diluted with 150 ml. of ethyl acetate. The mixture was filtered through a mat of Celite ® to give a clear yellow solution which was washed successively with water and saturated salt solution, dried over anhydrous magnesium sulfate, and evaporated to dryness under reduced pressure to afford a tan crystalline solid, yield 2.3 g.

Infrared:

$\lambda_{max.}^{CHCl_3}$ 3.25 (vinyl hydrogen), 5.78 (C–17 C=O), 6.05, 6.25, 6.40μ (weak, sharp bands).

(J) 6,6-difluoro-17α-ethynyl-17β-hydroxyestr-4-en-3-one (6,6-difluoronorethindrone)

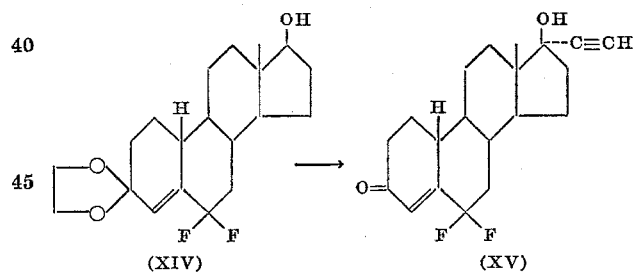

One hundred twenty-five ml. of dry tetrahydrofuran were added to 30 ml. of commercial 3M methyl magnesium bromide, and about 25 ml. of solvent were removed from the Grignard solution by distillation through a Vigreux column. The residual reagent was cooled in an ice bath while a vigorous stream of acetylene from a full cylinder was passed into it for 3 hours.

To the stirred ethynyl magnesium bromide solution was added a solution of the ketal from the preceding section in 25 ml. of dry tetrahydrofuran. The resultant mixture was heated at reflux for 3 hours, after which approximately 70 ml. of tetrahydrofuran was removed by distillation. The residue was poured into 200 ml. of water containing about 20 g. of ammonium chloride. The product was extracted with methylene chloride. The methylene chloride extracts were washed with water and saturated salt solution, dried over magnesium sulfate, and evaporated under reduced pressure to give a brown gum. The infrared spectrum showed only a trace of carbonyl at 5.78μ.

Infrared:

$\lambda_{max.}^{CHCl_3}$ 2.8, 2.95 (—OH), 3.05 (≡C–H, strong and sharp)

This compound can also be obtained by addition of sodium acetylide in dimethylsulfoxide to the ketal. The crude 17α-ethynyl ketal from above was dissolved in 40 ml. of 90% acetic acid, and the resulting tan solution was allowed to stand overnight at ambient temperature. Dilution with water and isolation of the reaction product with methylene chloride afforded 6,6-difluoro-17α-ethynyl-17β-hydroxyestr-4-en-3-one as a tan syrup which was purified by chromatography on neutral alumina (45 g.). Elution with benzene (9 one hundred ml. cuts) returned crystalline product. This was crystallized from methylene chloride-hexane to give colorless needles, yield 0.50 g., M.P. 165–167°; $[\alpha]_D^{24}$ —113° (CHCl₃). The analytical sample was sublimed.

Analysis.—Calc'd for $C_{20}H_{24}F_2O_2$ (percent): C, 71.8; H, 7.23; F, 11.35. Found (percent): C, 71.91, 72.18; H, 7.20, 7.35; F, 11.48.

Ultraviolet: $\lambda_{max}$ 228 (12,400) and 327 mμ (42).

Infrared: $\lambda_{max}$ 2.85 (—OH sharp), 3.05 (≡C—H, sharp), 4.77 (—C≡C—), 5.97 (C—3 conj. C=O), 8.60 (C—F).

(K) 6,6-difluoro-17α-ethynylestr-4-ene-3β,17β-diol

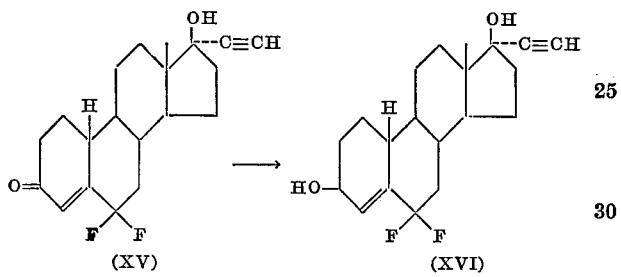

A mixture containing 1 g. of the hydroxyestr-4-en-3-one from section J of Example 3 and 3.0 g. of lithium aluminum tri-t-butoxy hydride in 50 ml. of tetrahydrofuran was stirred for 48 hours. An additional 1 g. of the aluminum hydride was added and stirring continued for an additional 20 hours. The mixture was poured into about 150 ml. of 5% acetic acid and stirred. There was obtained 0.708 g. of colorless leaflets of 6,6-difluoro-17α-ethynylestr-4-ene-3β,17β-diol.

EXAMPLE 4

6,6-difluoro-17α-ethynylestr-4-ene-3β,17β-diol diacetate

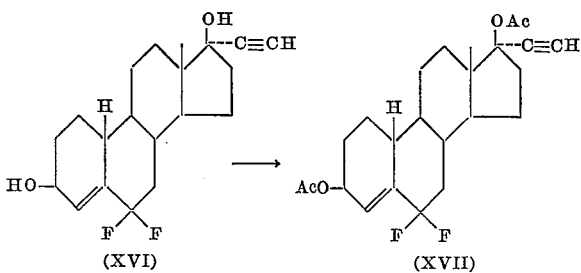

The product of section K of Example 3 was dissolved in 5 ml. of pyridine and 5 ml. of acetic anhydride was added. After heating at reflux for about 16 hours, this mixture was poured into ice water and extracted with methylene chloride. The extracts were washed with water and saturated salt solution. The residue was dissolved in benzene and absorbed on 30 g. of neutral alumina. Recrystallization of the product from hexane gave 0.51 g. of 6,6-difluoro-17α-ethynylestr-4-ene-3β-diol diacetate, M.P. 123–124° C.; $[\alpha]_D^{24}$ –105° (CHCl₂).

Analysis.—Calc'd for $C_{24}H_{30}F_2O_4$ (percent): C, 68.50; H, 7.19; F, 9.03. Found (percent): C, 68.79, 69.11; H, 6.80, 6.94; F, 9.10, 9.23.

The compound of section J of Example 3, 6,6-difluoro-17α-ethynyl-17β-hydroxyestr-4-en-3-one (also called 6,6-difluoronorethindrone), may be synthesized starting with norethindrone. This procedure, alternative to that outlined in Example 3, involves the following series of reactions:

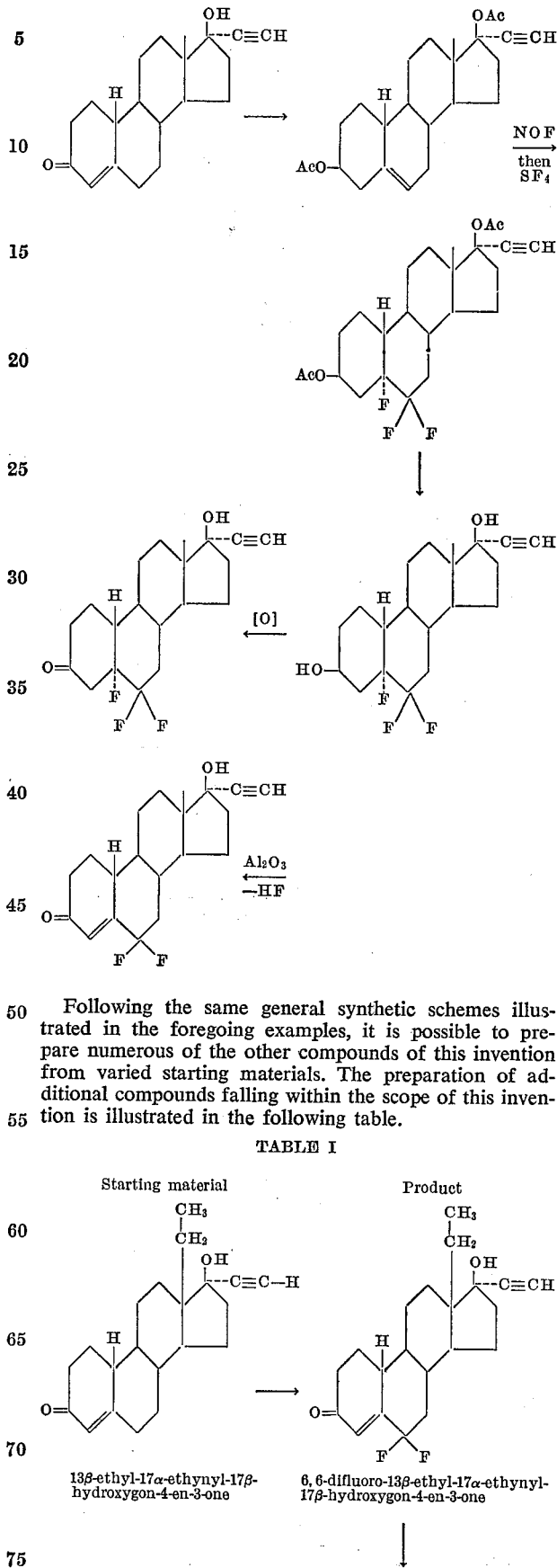

Following the same general synthetic schemes illustrated in the foregoing examples, it is possible to prepare numerous of the other compounds of this invention from varied starting materials. The preparation of additional compounds falling within the scope of this invention is illustrated in the following table.

TABLE I

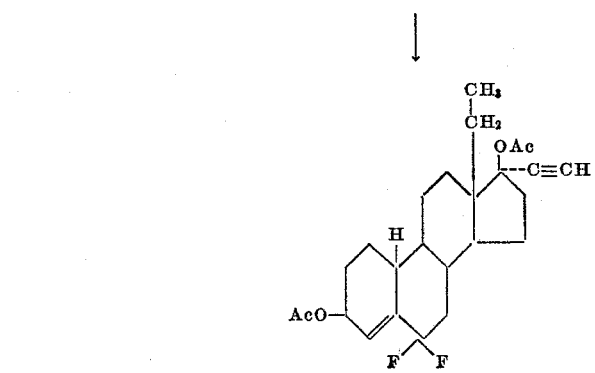

6,6-difluoro-13β-ethyl-17α-ethynyl-gon-4-en-3β,17β-diol diacetate

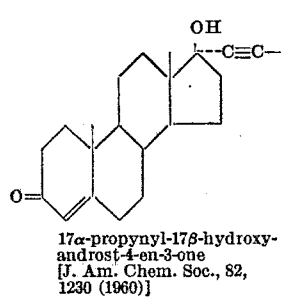

17α-propynyl-17β-hydroxy-androst-4-en-3-one
[J. Am. Chem. Soc., 82, 1230 (1960)]

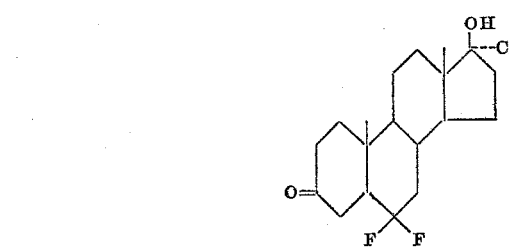

6,6-difluoro-17α-propynyl-17β-hydroxyandrost-4-en-3-one

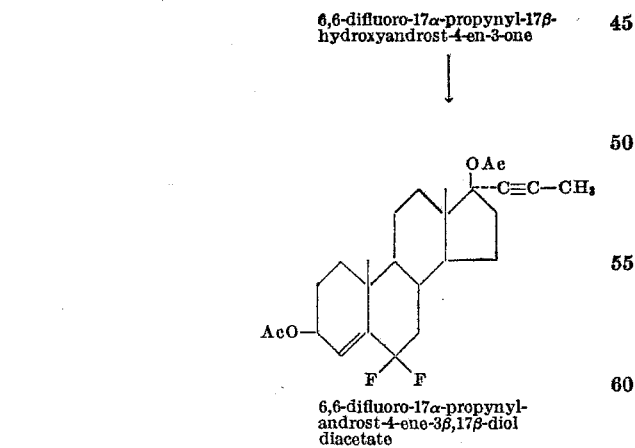

6,6-difluoro-17α-propynyl-androst-4-ene-3β,17β-diol diacetate

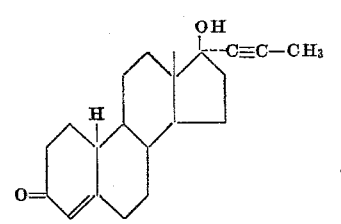

17α-propynyl-17β-hydroxy-estr-4-en-3-one

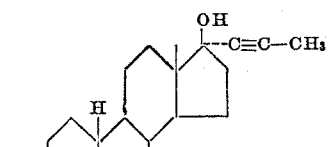

6,6-difluoro-17α-propynyl-17β-hydroxyestr-4-en-3-one

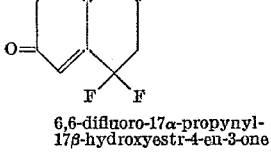

6,6-difluoro-17α-propynylestr-4-ene-3β,17β-diol diacetate

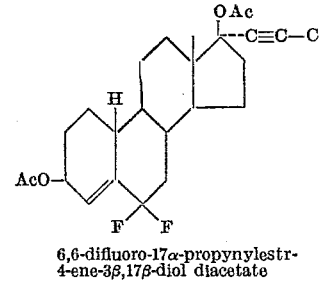

17α-trifluoropropynyl-17β-hydroxyestr-4-en-3-one

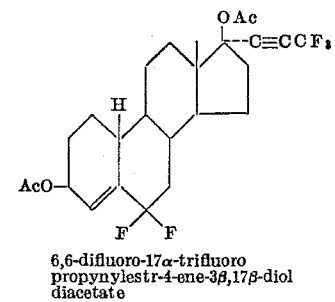

6,6-difluoro-17α-trifluoropropynylestr-4-ene-3β,17β-diol diacetate

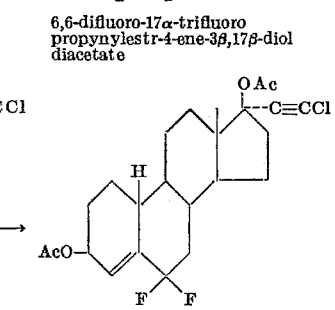

17α-chloroethynyl-17β-hydroxyestr-4-en-3-one 6,6-difluoro-17α-chloroethynyl-estr-4-ene-3β,17β-diol diacetate

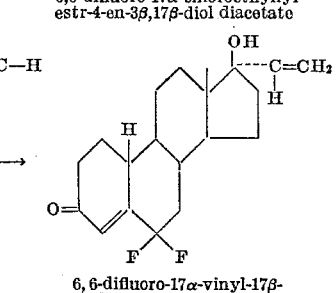

6,6-difluoronorethindrone 6,6-difluoro-17α-vinyl-17β-hydroxyestr-4-en-3-one

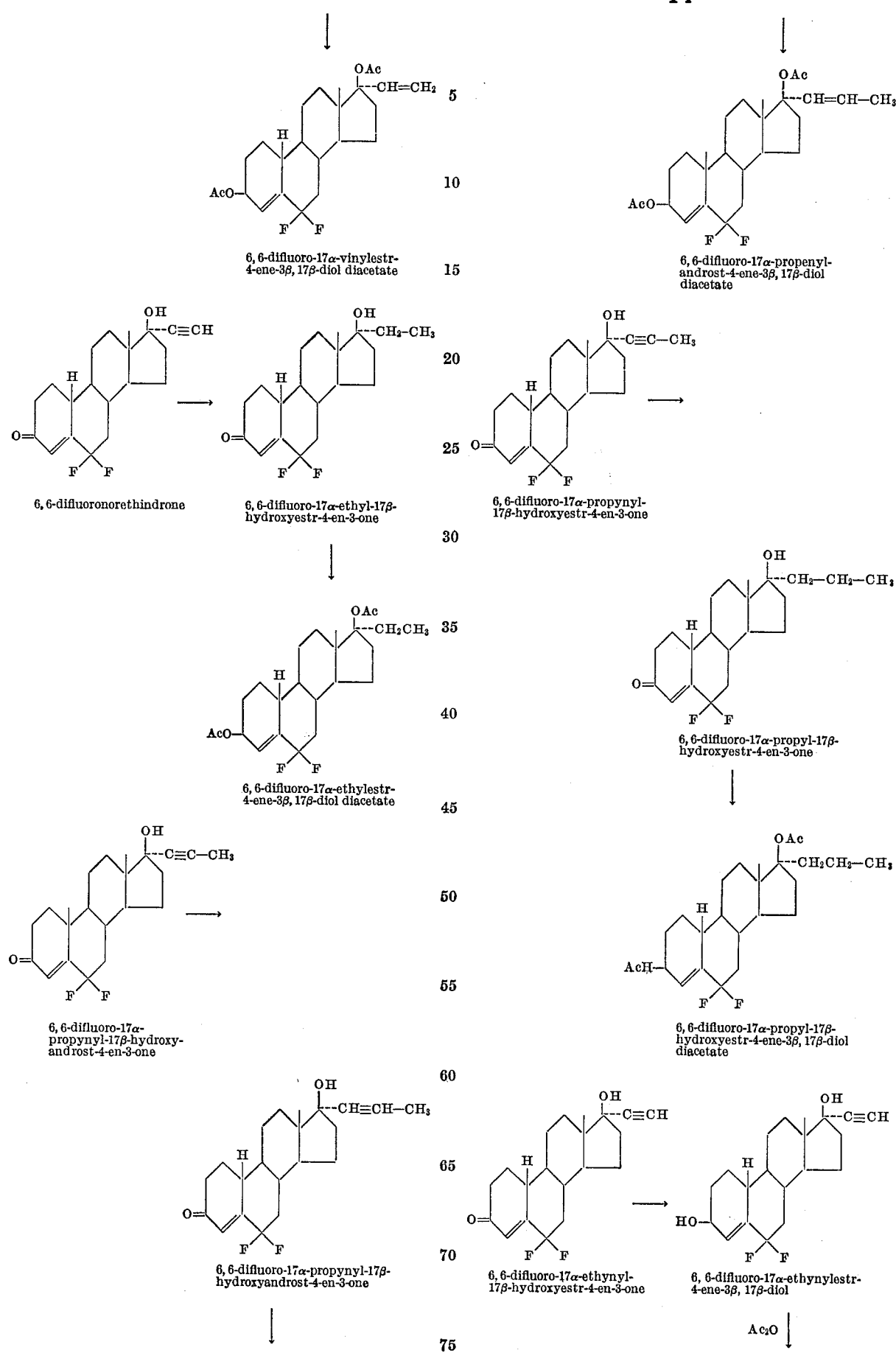

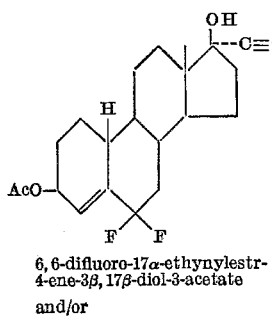

6,6-difluoro-17α-ethynylestr-
4-ene-3β,17β-diol-3-acetate
and/or 6,6-difluoro-17α-ethynylestr-
4-ene-3β,17β-diol-17-acetate When the products of Examples 1 and 3 are reacted with other acylating agents, other 3β,17β-diol derivatives are obtained. For example, when the products of these examples are treated with a bimolar amount of propionyl chloride, adamantoyl chloride, bicyclo[2.2.2]octanoyl chloride, or caproyl chloride, the products obtained include 6,6 - difluoro-17α-ethynylandrost-4-en-3β,17β-diol dipropionate, diadamantoate, di(bicyclo[2.2.2]octanoate), and dicaproate as well as the same ester derivatives of 6,6-difluoro-17α-ethynylestr-4-en-3β,17β-diol.

Treatment of the diol as obtained in Examples 1 and 3 with sodium hydride followed by reaction with methyl sulfate gives the corresponding 3β,17β-dimethoxy-6,6-difluoro-17α-ethynylandrost-4-ene and 3β,17β-dimethoxy-6,6-difluoro-17α-ethynylestr-4-ene. When the diols are treated with 2,3-dihydropyran in the presence of toluenesulfonic acid, the corresponding α-tetrahydropyranyl compounds are obtained, such as 3β,17β-di-α-tetrahydropyranyloxy-6,6-difluoro-17α-ethynylandrost - 4 - ene. In a similar manner, the corresponding cyclopentyl ether is obtained. As disclosed in U.S. 3,341,527, tetrahydrofuranyloxy derivatives of the 17-position are also available and by obvious reactions can be introduced in androstenes and estrenes to produce compounds of this invention.

The compounds of this invention are useful as oral and subcutaneous progestational agents. They also exhibit enhanced pituitary inhibiting (anti-gonadotropic) activity and anti-estrogenic activity. They are useful in regulation of estrus cycle in domestic animals, for the control of fertility and as progestational agents.

The utility of the compounds of this invention is demonstrated in the following test procedure. Results of the biological testing of the compounds of this invention are summarized in Table II.

Progestational assay

Immature female rabbits weighing 800–1000 grams are used in this assay. Beginning on day 1 the animals receive subcutaneously 5 μg. estradiol benzoate daily for 6 consecutive days (estrogen priming). Beginning on day 7 the test material (in 0.5% tragacanth) is administered once daily (by gavage or subcutaneous injection) for 5 consecutive days. The rabbits are autopsied on day 12. Sections of the uterine tissue taken for histological preparation are examined microscopically and progestational response shown with comparison to that of a standard progesterone.

TABLE II

| Compound | Biological activity |
|---|---|
| 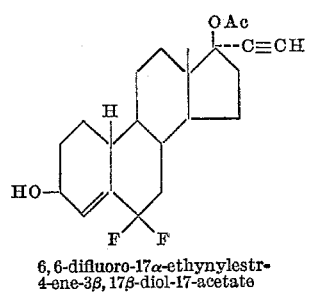 (Example 2) | 0.5× the oral progestational activity of norethindrone. |
| 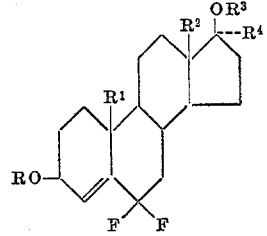 (Example 3) | 4× the anti-estrogenic activity of progesterone by subcutaneous route; at least 1.5× the oral progestational activity of norethindrone. |

Since obvious modifications and equivalents in the invention will be evident to those skilled in the chemical arts, I propose to be bound solely by the appended claims.

The embodiments of the invention in which an exclusive property or privilege is claimed are defined as follows:

1. A steroid compound of the formula wherein
$R^1$ is hydrogen or methyl;
$R^2$ is methyl or ethyl;
R and $R^3$, which may be the same or different, are selected from the group consisting of hydrogen, alkyl or oxacycloalkyl of up to five carbon atoms and an aliphatic or cycloaliphatic acid acyl group having up to six chain carbon atoms and a total of no more than eleven carbon atoms; and
$R^4$ is selected from the group consisting of —C≡CH, —C≡CCl, —C≡CCH₃, —C≡CCF₃, —CH=CH₂, —CH=CHCH₃, —CH₂CH₃ and —CH₂CH₂CH₃.

2. A steroid compound of claim 1 wherein $R^1$ is hydrogen, $R^2$ is methyl or ethyl, R and $R^3$ are hydrogen or acetyl and $R^4$ is —C≡CH or —C≡CCH₃.

3. The compound of claim 1 wherein $R^1=R^2$=methyl, $R=R^3$=hydrogen and $R^4$=ethynyl, 6,6 - difluoro - 17α-ethynylandrost-4-ene-3β,17β-diol.

4. The compound of claim 1 wherein $R^1=R^2$=methyl, $R=R^3$=acetyl and $R^4$=ethynyl, 6,6-difluoro-17α-ethynylandrost-4-ene-3β,17β-diol diacetate.

5. The compound of claim 1 wherein $R=R^1=R^3$=hydrogen, $R^2$=methyl and $R^4$=ethynyl, 6,6-difluoro-17α-ethynylestr-4-ene-3β,17β-diol.

6. The compound of claim 1 wherein $R=R^3$=acetyl, $R^1$=hydrogen, $R^2$=methyl and $R^4$=ethynyl, 6,6-difluoro-17α-ethynylestr-4-ene-3β,17β-diol diacetate.

7. The compound of claim 1 wherein $R=R^3$=acetyl, $R^1$=hydrogen, $R^2$=ethyl and $R^4$ ethynyl, 6,6-difluoro-13β-ethyl-17α-ethynylgon-4-ene-3β,17β-diol diacetate.

8. The compound of claim 1 wherein R=R³=acetyl, R¹=R²=methyl and R⁴=propynyl, 6,6 - difluoro - 17α-propynylandrost-4-ene-3β,17β-diol diacetate.

9. The compound of claim 1 wherein R=R³=acetyl, R¹=hydrogen, R²=methyl and R⁴=propynyl, 6,6-difluoro-17α-propynylestr-4-ene-3β,17β-diol diacetate.

10. The compound of claim 1 wherein R=R³=acetyl, R¹=hydrogen, R²=methyl and R⁴=trifluoropropynyl, 6,6 - difluoro - 17α - trifluoropropynylestr - 4 - ene-3β,17β-diol diacetate.

11. The compound of claim 1 wherein R=R³=acetyl, R¹=hydrogen, R²=methyl and R⁴=chloroethynyl, 6,6-difluoro-17α-chloroethynylestr-4-ene-3β,17β-diol diacetate.

12. The compound of claim 1 wherein R=R³=acetyl, R¹=hydrogen, R²=methyl and R⁴=vinyl, 6,6-difluoro-17α-vinylestr-4-ene-3β,17β-diol diacetate.

13. The compound of claim 1 wherein R=R³=acetyl, R¹=hydrogen, R²=methyl and R⁴=ethyl, 6,6-difluoro-17α-ethylestr-4-ene-3β,17β-diol diacetate.

14. The compound of claim 1 wherein R=R³=acetyl, R¹=R²=methyl and R⁴=propenyl, 6,6-difluoro-17α-propenylandrost-4-ene-3β,17β-diol diacetate.

15. The compound of claim 1 wherein R=R³=acetyl, R¹=hydrogen, R²=methyl and R⁴=propyl, 6,6-difluoro-17α-propyl-17β-hydroxyestr-4-ene-3β,17β-diol diacetate.

16. The compound of claim 1 wherein R=acetyl, R¹=R³=hydrogen, R²=methyl and R⁴=ethynyl, 6,6-difluoro-17α-ethynylestr-4-ene-3β,17β-diol 3-acetate.

17. The compound of claim 1 wherein R=R¹=hydrogen, R²=methyl, R³=acetyl and R⁴=ethynyl, 6,6-difluoro-17α-ethynyl-3β-hydroxyestr-4-ene-3β,17β-diol 17-acetate.

References Cited

UNITED STATES PATENTS 3,219,673  11/1965  Boswell.

HENRY A. FRENCH, Primary Examiner

U.S. Cl. X.R.

260—239.55, 397.3, 397.4, 999